United States Patent
Saksena et al.

(10) Patent No.: US 8,601,939 B2
(45) Date of Patent: Dec. 10, 2013

(54) STEAM COOKING APPARATUS WITH STEAM FLUSHING SYSTEM

(75) Inventors: Atul Saksena, Troy, OH (US); Larry W. Lyons, Hillsboro, OR (US); Michael B. Reckner, Dayton, OH (US)

(73) Assignee: Premark FEG L.L.C., Glenview, IL (US)

( * ) Notice: Subject to any disclaimer, the term of this patent is extended or adjusted under 35 U.S.C. 154(b) by 1543 days.

(21) Appl. No.: 11/857,479

(22) Filed: Sep. 19, 2007

(65) Prior Publication Data

US 2009/0071346 A1 Mar. 19, 2009

(51) Int. Cl.
*A47J 27/00* (2006.01)

(52) U.S. Cl.
USPC .................... 99/330; 126/20; 126/369

(58) Field of Classification Search
USPC ............... 99/330, 473; 126/20, 369; 134/37
See application file for complete search history.

(56) References Cited

U.S. PATENT DOCUMENTS

| | | |
|---|---|---|
| 3,181,750 A | 5/1965 | Helliwell et al. |
| 3,207,058 A | 9/1965 | Gaylord |
| 3,247,776 A | 4/1966 | Gaylord |
| 3,744,474 A | 7/1973 | Shaw |
| 3,761,024 A | 9/1973 | Schwey et al. |
| 3,818,819 A * | 6/1974 | Shulz et al. ............ 99/330 |
| 3,992,984 A * | 11/1976 | Treiber ............ 99/330 |
| 4,935,066 A | 6/1990 | Wright |
| 4,991,545 A | 2/1991 | Rabe et al. |
| 5,014,679 A * | 5/1991 | Childs et al. ............ 126/21 A |
| 5,586,487 A * | 12/1996 | Marino ............ 99/330 |
| 6,328,901 B1 | 12/2001 | Batten |
| 6,368,501 B1 | 4/2002 | Batten |

FOREIGN PATENT DOCUMENTS

| | | |
|---|---|---|
| DE | 102004001220 | 3/2005 |
| DE | 102006010460 | 9/2007 |
| EP | 1617148 | 1/2006 |
| FR | 2849164 | 6/2004 |
| GB | 1320883 | 1/1972 |
| GB | 1438907 | 1/1974 |

OTHER PUBLICATIONS

Machine Translation of DE 10 2006 010 460 A1, Sep. 06, 2007, Breinl et al.*
Translation of DE 10 2006 010 460 A1, Sep. 06, 2007, Brienl et al.*

* cited by examiner

*Primary Examiner* — Henry Yuen
*Assistant Examiner* — John Wasaff
(74) *Attorney, Agent, or Firm* — Thompson Hine LLP

(57) ABSTRACT

A steam cooking system includes a steam cooking chamber having an access door and a drain for draining condensate from the steam cooking chamber along a drain path. A steam generator unit heats water to generate steam. The steam generator unit is connected for delivery of steam from the steam generator to the steam cooking chamber via a first steam path during a cooking operation. The steam generator unit is also connected for delivery of steam from the steam generator to the drain path via a second steam path during a steam flushing operation.

17 Claims, 2 Drawing Sheets

STEAM COOKING APPARATUS WITH STEAM FLUSHING SYSTEM

TECHNICAL FIELD

The present application relates to steam cookers, and more particularly to a steam cooker with steam flushing system.

BACKGROUND

Steam cookers have been successfully employed by restaurants, hospitals and other food service operations to prepare large quantities of food quickly and conveniently. Increases in productivity and efficiency are regularly sought, for example, to decrease the time and energy needed to cook the products.

SUMMARY

In an aspect, a steam cooking system includes a steam cooking chamber having an access door and a drain for draining condensate from the steam cooking chamber along a drain path. A steam generator unit heats water to generate steam. The steam generator unit is connected for delivery of steam from the steam generator to the steam cooking chamber via a first steam path during a cooking operation. The steam generator unit is also connected for delivery of steam from the steam generator to the drain path via a second steam path during a steam flushing operation.

In another aspect, a method of cleaning a steam cooking system is provided. The method includes generating steam using a steam generator. The steam generator is connected to a steam cooking chamber for delivery of steam to the steam cooking chamber via a first steam path during a cooking operation. The steam cooking chamber has an access door and a drain for draining condensate from the steam cooking chamber along a drain path. Steam is delivered from the steam generator to the drain path via a second steam path during a steam flushing operation.

The details of one or more embodiments are set forth in the accompanying drawings and the description below. Other features, objects, and advantages will be apparent from the description and drawings, and from the claims.

DETAILED DESCRIPTION

Figure 1:
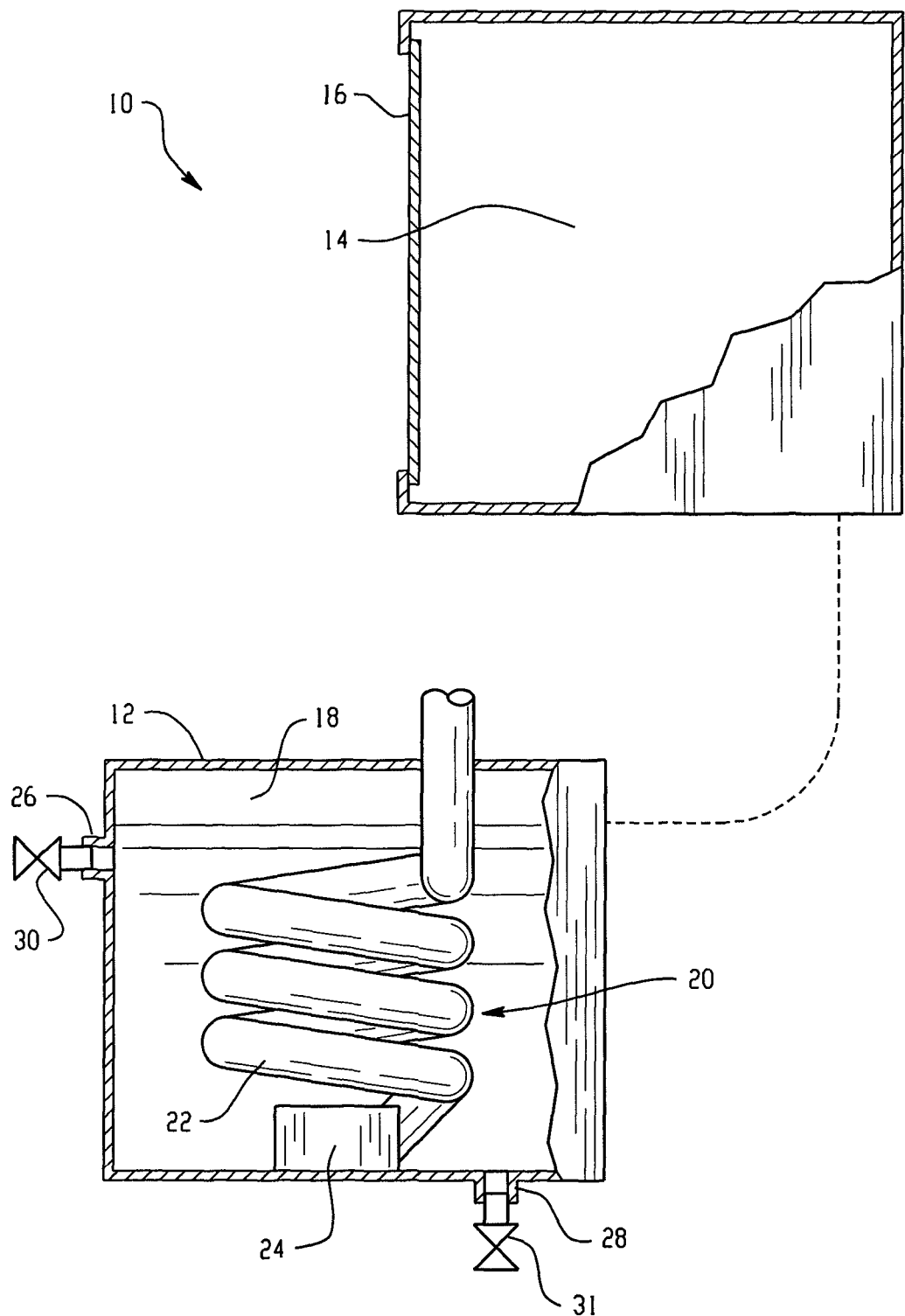
FIG. 1 is a diagrammatic view of an embodiment of a steam cooking system.

Referring to FIG. 1, a steam cooker system 10 includes a steam generator 12 for generating steam and a cooking chamber 14 that is in communication with the steam generator. The cooking chamber 14 is formed by an insulated housing and includes a door 16 that is moveable between open and closed positions. In some embodiments not shown by FIG. 1, the system 10 may include more than one cooking chamber 14 connected to the steam generator 12, such as two cooking chambers.

Disposed in a heating chamber 18 of the steam generator 12 may be any suitable heating system 20. In one embodiment, the heating system 20 includes a gas heat exchanger 22 in the form of a submerged heat exchange tube. The heat exchanger 22 is connected to a burner unit 24 (e.g., a metal fiber, fan driven burner) that is capable of generating hot gases for delivery to the heat exchanger. The heat exchanger 22 is located in the heating chamber 18 such that it can be in a heat exchange relationship with water disposed therein. While the illustrated heat exchange relationship is via submersion with the heat exchanger, it is possible that hot gas could pass through ducts that are not submerged, such as ducts that run across the interior wall of the heating chamber 18. Electric heating elements could also be used.

The heating chamber 18 includes an inlet 26 for ingress of water into the heating chamber from a water source and an outlet 28 for egress of water from the heating chamber. A valve 30 may control water flow into the heating chamber, e.g., to maintain a desired water level within the heating chamber 18 during steam production. Water level sensors may be positioned in the heating chamber 18 for this purpose. Similarly, a valve 31 may control water flow from the heating chamber 18 during a flushing operation.

Figure 2:
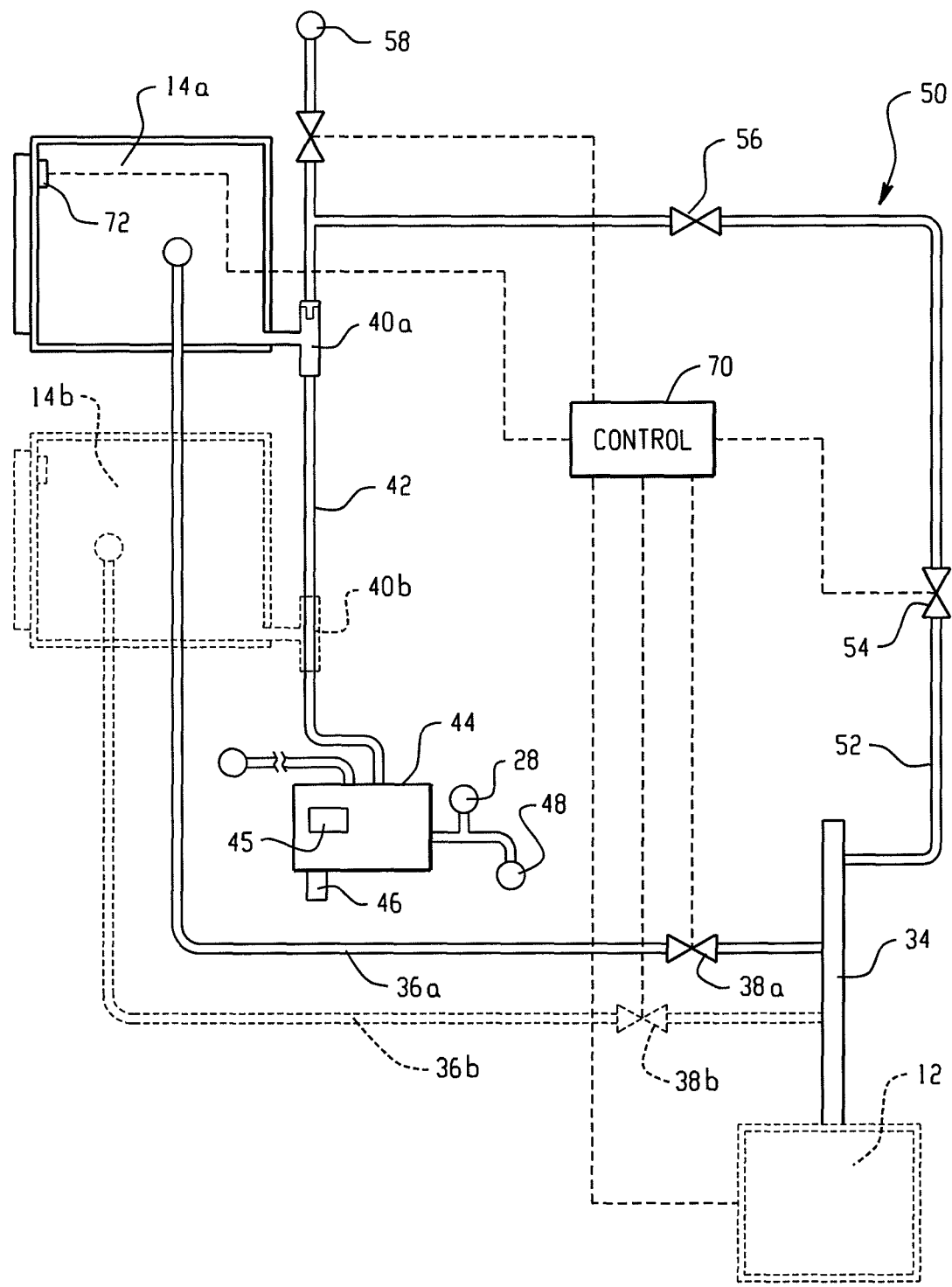
FIG. 2 is a diagrammatic view of the steam cooking system of FIG. 1 including steam flushing system.

Referring now to FIG. 2, the steam generator 12 is connected to the cooking chamber 14a. In some embodiments, as noted above, the steam generator 12 may also be connected to another cooking chamber 14b represented by dashed lines.

In the illustrated embodiment, a steam header 34 is used to connect steam cooking lines 36a and 36b to the steam generator 12. The steam cooking lines 36a and 36b are, in turn, connected to the cooking chambers 14a and 14b. Steam valves 38a and 38b are used to control delivery of steam to the cooking chambers 14a and 14b.

Cooking compartment drains 40a and 40b are used for draining condensed water, other liquids and debris from their respective cooking chambers 14. The cooking compartment drains 40a and 40b are connected to a drain line 42, which is, in turn, connected to a condenser 44. The drain line 42 carries the water, other liquids and debris from the cooking compartment drain 40 to the condenser 44, where the water, other liquids and debris can be flushed into a floor drain line 46. Typically, the floor drain line 46 has a diameter that is larger than that of the drain line 42 to facilitate the draining of debris flushed from the drain line. In some embodiments, the outlet 28 of the steam generator 12 is also connected to the condenser 44. A cooling water line 48 may be used to reduce temperature of the water drained from the steam generator 12 to an acceptable level. The condenser 44 may include a temperature sensor 45 for use in determining the temperature of the fluids and other particles before they enter the floor drain line 46. In some embodiments, cooling water may be delivered to the condenser 44 if the temperature determined is above a predetermined temperature level permitted by local code.

Occasionally, fat and/or oils drained from the steam cooking chamber 14 can build up in the drain line 42, reducing the effectiveness of the drain path. Accordingly, a steam flushing system, referred to generally as element 50, is used to flush debris, such as food particles, oils and fats from the drain line 42. Steam flushing system 50 includes a steam flush line 52 that is connected to the steam generator 12 via the steam header 34. Thus, in this embodiment, the steam generator 12 selectively supplies steam to the cooking chambers 14 and the steam flushing system 50. A steam valve 54 controls delivery of the steam through the steam flushing system 50. In some instances, the steam valve 54 provides steam at rate of between about one lb/hr and about three lb/hr, such as about 2 lb/hr. The rate of steam delivery may vary, however. As can be seen, the steam flush line 52 is connected to the drain line 42. A check valve 56 is located between the steam valve 54 and the drain line 42 to inhibit reverse flow of steam, liquids and debris thereby. In some embodiments, a compartment drain cooling water line 58 is also connected to the drain line 42 for temperature control in the drain line.

As steam is delivered through the drain line 42, any solidified fats and/or oils will tend to liquefy due to the temperatures effectively cleaning the drain line 42. In operation, control 70 may include respective connections to the steam generator 12 for controlling production responsive to a cooking chamber interface 72 setting, connections to steam cooking line valves 38 to control delivery of steam to the chambers 14, and connection to the steam flush line valve 54 to control steam delivery to the drain line 42. The control may be configured to perform the steam flush operation for the drain line 42 on a timed basis, e.g., periodically as part of a steam generator shut down procedure and/or responsive to a specific control input of the interface 72. In one embodiment, the steam flush operation is performed upon shut down where steam is delivered to the drain line 42 immediately prior to draining of the steam generator 12. After steam is delivered to the drain line 42, the water is drained from the steam generator 12, into the condenser 44. In some embodiments, the steam flush operation is not connected to shut down. For example, the steam flush operation may be initiated manually through a user input.

In the illustrated two chamber system, a separate steam delivery line 36b and associated valve 38b is provided for the second chamber 14b. The drain 40b of the second chamber 14b is connected to the same drain line 42 as the first chamber 14a, such that a single steam flushing operation via valve 54 is sufficient to clean the drain paths of both chambers. In an alternative arrangement, the drain path of the second chamber 14b is distinct from the drain path of the first chamber 14a, and two steam flush lines could be provided, one for each drain path.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A steam cooking system, comprising:
    a steam cooking chamber having an access door and a drain for draining condensate from the steam cooking chamber along a drain path; and
    a steam generator unit for heating water to generate steam, the steam generator unit connected for delivery of steam from the steam generator unit to the steam cooking chamber via a first steam path during a cooking operation, the steam generator unit also connected for delivery of steam from the steam generator to the drain path via a second steam path during a steam flushing operation.

2. The steam cooking system of claim 1 further comprising a steam valve that controls delivery of steam from the steam generator to the drain path.

3. The steam cooking system of claim 2 further comprising a control connected to the steam valve for selectively initiating the steam flushing operation.

4. The steam cooking system of claim 3, wherein steam is delivered to the drain path at a rate of between one lb/hr and three lb/hr.

5. The steam cooking system of claim 4 further comprising a one-way valve along the second steam path between the steam valve and the drain path for inhibiting reverse flow of steam thereby.

6. The steam cooking system of claim 1, wherein at least a portion of the second steam path is different from the first steam path.

7. The steam cooking system of claim 1 further comprising a temperature control system connected to the drain path, the temperature control system configured to regulate temperature of water drained through the drain path.

8. The steam cooking system of claim 1 further comprising a building drain connected to the drain path.

9. The steam cooking system of claim 1, wherein the steam cooking chamber is a first steam cooking chamber, the steam generator unit connected for delivery of steam from the steam generator to a second steam cooking chamber during a cooking operation, the second steam cooking chamber having a drain path connected for receiving steam for steam flushing of the drain path of the second steam cooking chamber.

10. A method of cleaning a steam cooking system, the method comprising:
    generating steam using a steam generator, the steam generator connected to a steam cooking chamber for delivery of steam to the steam cooking chamber via a first steam path during a cooking operation, the steam cooking chamber having an access door and a drain for draining condensate from the steam cooking chamber along a drain path; and
    delivering steam from the steam generator to the drain path via a second steam path during a steam flushing operation.

11. The method of claim 10 further comprising controlling delivery of steam from the steam generator to the drain path using a steam valve.

12. The method of claim 11 further comprising selectively initiating the steam flushing operation using a controller connected to the steam valve.

13. The method of claim 12 comprising delivering steam to the drain path at a rate of between one lb/hr and three lb/hr.

14. The method of claim 13 further comprising inhibiting reverse flow of steam from the drain path by providing a one-way valve along the second steam path between the steam valve and the drain path.

15. The method of claim 10 further comprising regulating temperature of water drained through the drain path using a temperature control system connected to the drain path.

16. The method of claim 10 further comprising draining the drain path into a building drain.

17. The method of claim 10 further comprising
    providing a second steam cooking chamber, the second steam cooking chamber having an access door and a drain for draining condensate from the steam cooking chamber along a drain path; and
    delivering steam from the steam generator to the drain path of the second cooking chamber during a steam flushing operation.

\* \* \* \* \*